Patented May 28, 1940

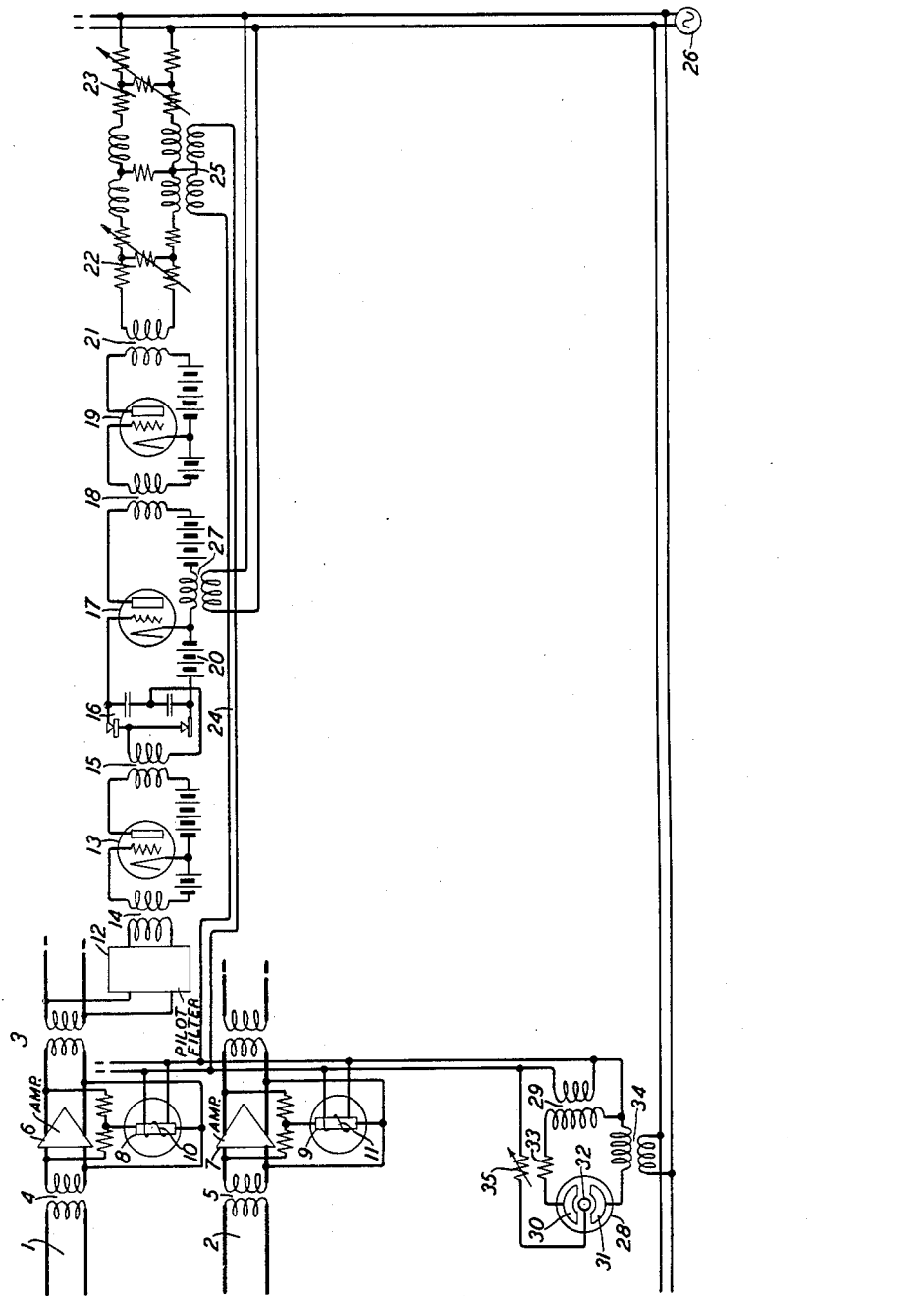

2,201,983

UNITED STATES PATENT OFFICE 2,201,983

POWER SUPPLY CIRCUIT

John H. Bollman, Rutherford, N. J., assignor to Bell Telephone Laboratories, Incorporated, New York, N. Y., a corporation of New York Original application February 11, 1939, Serial No. 255,962. Divided and this application August 2, 1939, Serial No. 287,917

5 Claims. (Cl. 171—97)

This invention relates to power supply circuits and particularly to power supply circuits having a main power source and an auxiliary power source.

This application is a division of the J. H. Bollman application Serial No. 255,962, filed February 11, 1939.

One object of the invention is to provide a power supply circuit having a main source of current adapted to be connected to a load and an auxiliary source of current that shall replace the main source in supplying power to the load by the auxiliary source in an improved manner in case of failure of the main source.

Another object of the invention is to provide a power supply circuit having a main source of current connected to a load and an auxiliary source of current that shall replace the main source in supplying power to the load by the auxiliary source under control of a cold cathode tube in case of failure of the main source.

A further object of the invention is to provide a power supply circuit having a main source of controlled alternating current connected to a load, an auxiliary source of alternating current having the same frequency as said main source, and a cold cathode tube having an ignition circuit and an operating circuit that shall connect the two sources to the tube ignition circuit in phase opposition so that the tube is ignited upon failure of the main source and that shall connect the auxiliary source through the tube operating circuit for energizing the load upon failure of the main source and ignition of the tube.

In many regulator or control systems power from a source is varied to govern the operation of a machine or a circuit. In case of the failure of the source of power, all regulation ceases and the characteristic of the machine or circuit under regulation may assume an extreme value. It is desirable to have the characteristic of the machine or circuit under regulation to assume an average value in case of failure of the control current.

According to the invention, a main source of alternating current power and an auxiliary source of alternating current power are provided for controlling the energization of a load circuit. The power from the main source of current is varied to energize a load circuit according to predetermined characteristic. In case of failure of the power from the main source, the load is energized at fixed and constant value by power from the auxiliary source.

This invention is illustrated by means of a carrier current system. However, it is to be understood that the invention is not limited to use with carrier current systems or to cable systems. In the system employed to describe the invention, a cable having a number of pairs of wires transmits carrier waves and also a pilot current which is employed for control purposes. Gain control stations are located at intervals along the cable. At each station an amplifier is employed for each pair of wires. At one station, which may be called the main station, the pilot current is filtered from the carrier current associated therewith and is employed for controlling the strength of a low frequency current. The low frequency current may be a standard 60-cycle power current which is assumed to have a substantially constant voltage.

The low frequency 60-cycle current which is controlled in accordance with the strength of the pilot current at the main station is employed to govern the various amplifiers at the main and also at auxiliary stations (not shown). At each station the amplifiers are provided with beta circuits and each beta circuit is controlled by an element of silver sulphide. A heater coil is associated with each silver sulphide element for controlling the gain of the amplifier. The heater coils at each station are connected in parallel to the low frequency current which is governed by the pilot current.

In case of failure of the low frequency control current, all heating of the heater elements may be stopped, which would cause the amplifiers to assume an extreme position. In order to prevent interference with the transmission of signals by reason of failure of the control current, an auxiliary low frequency alternating current is provided for energizing the heater coils in case of failure of the controlled low frequency current. The auxiliary alternating current has a substantially constant voltage and energizes the heater coils to heat all silver sulphide elements to a mean temperature whereby an average gain by the amplifiers is effected.

The transfer from the main source of controlled low frequency current to the auxiliary low frequency current is effected by means of a three-element cold cathode tube. The controlled low frequency current and also the auxiliary low frequency current are inductively connected to the ignition circuit of the cold cathode tube. The two sources of current are connected in phase opposition to the ignition circuit so that no ignition of the tube can take place when both sources are in operation. The auxiliary source is also connected to the heater coils through the operating circuit of the cold cathode tube. Thus, in case of failure of the control low frequency current, the tube is ignited and power is supplied from the auxiliary low frequency source to the heater coils in parallel.

The single figure in the accompanying drawing is a diagrammatic view of power circuits constructed in accordance with the invention.

Referring to the drawing, a cable system is illustrated wherein carrier currents are transmitted by different pairs of conductors in a cable. In the drawing only two pairs of conductors numbered 1 and 2 are illustrated. It is to be understood that the cable may be provided with any desired number of pairs of conductors which are controlled in the same manner as the pairs of conductors 1 and 2.

The pairs of conductors 1 and 2 are shown connected to a main amplifier station 3 by means of transformers 4 and 5. An amplifier is provided at the station 3 for each pair of conductors. At the station 3 amplifiers 6 and 7 are respectively provided for the pairs of conductors 1 and 2. The amplifiers 6 and 7 at the station 3 are of the feedback type and are each controlled by varying a resistance element in the beta circuit. Preferably the resistance element in the beta circuit of each amplifier has a high negative temperature coefficient of resistance and may, for example, be boron or silver sulphide. The amplifiers 6 and 7 at the station 3 have resistance elements 8 and 9 located in the beta circuits. Heater coils 10 and 11 are respectively provided for heating the resistance elements 8 and 9.

The pairs of conductors 1 and 2 may not only have carrier channels but may have pilot channels thereon. The pair of conductors 1 is assumed to have a pilot channel which carries pilot current from a suitable pilot generator (not shown). The pilot current on the pair of conductors 1 at station 3 is selected from the carrier currents by means of a pilot filter 12. The pilot filter 12 is connected to an amplifier tube 13 by means of a transformer 14. The amplifier tube 13 is connected by a transformer 15 to a copper-oxide rectifier 16 of the doubler type. The rectifier 16 is connected to a control tube 17 which in turn is connected by a transformer 18 to an amplifier tube 19. Battery 20, placed between the rectifier 16 and the tube 17 opposes the rectified voltage in order to obtain voltage changes which are more than proportional to the amplitude changes by the pilot current. The amplified tube 19 is connected by a transformer 21 to an adjustable resistance pad 22. The resistance pad 22 is adjusted to control the rate of gain change by the amplifiers 6 and 7 at the station 3. A second resistance pad 23 serves to control the flat gain of the amplifiers 6 and 7 at the station 3. The resistance pads 22 and 23 are connected to each other and to a control circuit 24 by means of a hybrid coil 25.

A source of low frequency current 26, which may be a standard 60-cycle power circuit having a constant voltage, is provided at the station 3. Low frequency current from the source 26 is supplied to the output circuit of the control tube 17 by means of a transformer 27. This low frequency current supplied to the tube 17 is controlled according to the amplitude of the pilot current on the pilot channel at the station 3. Low frequency current from the source 26 is also supplied to the resistance pad 23.

A tube 28, which may be a cold cathode gas-filled tube, is provided for insuring the heating of the coils 10 and 11 at a fixed temperature in case of failure of the control current supplied by the control circuit 24. The control circuit 24, which may be considered a source of variable control current, is connected not only in parallel to the hybrid coils 10 and 11 but is also connected to the primary winding of a transformer 29. The secondary winding of the transformer 29 is connected in the ignition circuit of the tube 28. The tube 28 is provided with three electrodes 30, 31 and 32. The electrodes 30 and 31 are in the ignition circuit of the tube 28 and the electrodes 32 and 31 are included in the operating circuit of the tube 28. The ignition circuit of the tube 28 not only includes the electrodes 30 and 31, the secondary winding of the transformer 29 and a resistance element 33, but also the secondary winding of the transformer 34. The primary winding of the transformer 34 is connected to the source of low frequency current 26. The operating circuit of the tube 28 includes the electrodes 31 and 32, secondary winding of the transformer 34, and an adjustable resistance element 35.

In a circuit constructed as above set forth the gain of the amplifiers 6 and 7 at the station 3 is controlled according to the amplitude of the pilot current on the pilot channel. The pilot current is selected from the carrier currents at station 3 by means of the filter 12. The pilot current is then amplified by the tube 13 and rectified by the rectifier 16. The rectified pilot current governs the operation of the control tube 17. The low frequency current is controlled according to the amplitude of the pilot current by means of the control tube 17. The low frequency current governed according to the amplitude of the pilot current is amplified by the tube 19 and supplied to the gain rate adjusting pad 22. The pad 22, as before set forth, is adjusted to control the rate of gain by the amplifiers 6 and 7 at station 3. The pad 23 is adjusted to adjust the flat gain by the amplifiers 6 and 7 at the station 3. The flat gain pad 23 is connected to the source 26 and the two pads 22 and 23 are connected by the hybrid coil 25 to the control circuit 24. The control circuit 24 is connected in parallel to the heater coils 10 and 11. The heater coils 10 and 11 control the resistance elements 8 and 9, which in turn govern the gain by the amplifiers 6 and 7.

The low frequency control current from the circuit 24 energizes the transformer 29 which is connected to the ignition circuit of the cold cathode tube 28. The power supplied to the ignition circuit of the tube 28 from the transformer 29 is opposed by power supplied from the low frequency source 26 by means of a transformer 34. The power from the two sources oppose each other and prevent ignition of the tube 28. The two sources of power supplied to the ignition circuit of the tube 28 have the same frequency and are in phase opposition. In case of failure of the control circuit 24, the transformer 29 in the ignition circuit of the tube 28 is deenergized and immediately the tube 28 is ignited by power supplied from the source 26 through the transformer 34. Upon ignition of the tube 28 power is then supplied to the heater coils 10 and 11 through the operating circuit of the tube 28. The heating of the resistance elements 8 and 9 by power supplied from the source 26 through the transformer 34 and the operating circuit of the tube 28 is presumed to hold the amplifiers 6 and 7 at an average gain.

In the circuits above described the resistance elements 8 and 9 in the beta circuits of the amplifiers 6 and 7 are normally controlled according to the amplitude of the pilot current to control the gain on the pairs of conductors. In case of failure of the circuit 24 for any reason no power will be supplied to the heater coils 10 and 11 unless an auxiliary source is supplied. If no auxiliary source were supplied, the amplifiers 6 and 7 would assume an extreme position which would interfere with the transmission of signals on the pairs of conductors 1 and 2. In order to heat the resistance elements 8 and 9 to an average temperature and maintain an average gain by the amplifiers 6 and 7, the auxiliary source of substantially constant voltage is connected through the cold cathode tube 28 to the heater elements 10 and 11 upon failure of the source supplied by the circuit 24.

Modifications in the circuits and in the arrangement and location of parts may be made within the spirit and scope of the invention, and such modifications are intended to be covered by the appended claims.

What is claimed is:

1. In combination, a source of control current, a load connected to said source of current, a second source of current, a marginal device having a control circuit and an operating circuit and means for connecting said two sources in opposition to said control circuit to prevent operation of the device under normal conditions and for connecting the second source of current in circuit with the operating circuit and the load to energize the load upon failure of the first source of control current and operation of the device.

2. In combination, a main source of control current, a load connected to said main source of current, a second source of current, a cold cathode tube having an ignition circuit and an operating circuit, and means for connecting said two sources in opposition to said ignition circuit to prevent operation of the tube under normal conditions and for connecting the second source of current to the load through the operating circuit of the tube to energize the load upon failure of the first source of current and ignition of the tube.

3. In combination, a main source of alternating current, a load connected to said main source of current, a second source of alternating current having the same frequency as said main source of current, a cold cathode tube having an ignition circuit and an operating circuit, and means for connecting said two sources in phase opposition to the ignition circuit of the tube under normal conditions and for connecting the second source of current to the load through the operating circuit of the tube to energize the load upon failure of the first source of current and ignition of the tube.

4. In combination, a main source of variable alternating current, a load connected to said source, a three-element cold cathode tube having an ignition circuit and a control circuit, a second source of alternating current having the same frequency as said variable source and having a constant voltage, means for inductively connecting said two sources of alternating current to the ignition circuit in phase opposition to prevent ignition of said tube when said variable source is in operation, and means for connecting said second source of alternating current through the operating circuit of said tube to the load to energize said load upon failure of said variable source of alternating current and ignition of said tube.

5. In combination, a source of control alternating current, a load connected to said source of current, a second source of alternating current, a marginal device having a starting circuit and an operating circuit, means for connecting said two sources of alternating current to said starting circuit in phase opposition to prevent operation of the device under normal conditions, and means for connecting said second source of current through the operating circuit of said device to the load to energize the load upon failure of the first source of current and operation of said device.

JOHN H. BOLLMAN.